(12) United States Patent
Wu et al.

(10) Patent No.: US 7,951,856 B2
(45) Date of Patent: May 31, 2011

(54) COATING COMPOSITION WITH ACCELERATED LOW TEMPERATURE CURE

(75) Inventors: Shaobing Wu, Jamestown, NC (US); Larry B. Brandenburger, Lino Lakes, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 901 days.

(21) Appl. No.: 11/879,021

(22) Filed: Jul. 13, 2007

(65) Prior Publication Data
US 2009/0017215 A1   Jan. 15, 2009

(51) Int. Cl.
| | |
|---|---|
| *C08L 67/07* | (2006.01) |
| *C08L 67/06* | (2006.01) |
| *C08F 299/04* | (2006.01) |
| *C08F 20/40* | (2006.01) |
| *C08F 20/68* | (2006.01) |
| *C09D 101/12* | (2006.01) |
| *C09D 101/14* | (2006.01) |
| *C09F 9/00* | (2006.01) |

(52) U.S. Cl. .......... 523/500; 523/523; 106/168.01; 106/171.1; 106/310; 525/11; 525/445; 525/447

(58) Field of Classification Search .......... 523/500, 523/523; 106/310, 171.1, 168.01; 525/11, 525/445, 447
See application file for complete search history.

(56) References Cited

U.S. PATENT DOCUMENTS

| | | | |
|---|---|---|---|
| 2,498,091 A | | 2/1950 | Moffett |
| 2,955,949 A | | 10/1960 | Kirshenbaum et al. |
| 4,829,123 A | * | 5/1989 | Shigematsu et al. ............ 525/28 |
| 6,126,699 A | | 10/2000 | McCurley |
| 2002/0169241 A1 | * | 11/2002 | Colyer et al. ................. 524/190 |

FOREIGN PATENT DOCUMENTS

JP   2006 257370 A   9/2006

OTHER PUBLICATIONS

Written Opinion of the International Preliminary Examining Authority for corresponding patent application No. PCT/US2008/008472, mailed Jun. 22, 2009, 4 pages.
Notification of Transmittal of the International Search Report and the Written Opinion for corresponding patent application No. PCT/US2008/008472, mailed Nov. 7, 2008, 12 pages.
WPI Week, 200159, Thomson Scientific, XP002501561, JP 2001 172307, Jun. 26, 2001, 3 pages.
Notification of Transmittal of the International Preliminary Report on Patentability for corresponding patent application No. PCT/US2008/008472, mailed Sep. 11, 2009, 10 pages.
Reply to Written Opinion for corresponding patent application No. PCT/US2008/008472, filed May 12, 2009, 13 pages.

* cited by examiner

*Primary Examiner* — Mark Eashoo
*Assistant Examiner* — Michael Pepitone
(74) *Attorney, Agent, or Firm* — Shumaker & Sieffert, P.A.

(57) ABSTRACT

A coating composition including an unsaturated resin selected from polyesters, alkyds or combinations thereof; an alkoxy(meth)acrylic functional monomer, and a thermoplastic compound containing active hydrogen groups; a curing agent; and a curing promoter such as at least one metal drier.

12 Claims, No Drawings

COATING COMPOSITION WITH ACCELERATED LOW TEMPERATURE CURE

TECHNICAL FIELD

The present disclosure relates to coating compositions that are suitable for use in formulating stains, primers, sealers and topcoats to finish a wide variety of substrates (e.g. wood, plastic and metal).

BACKGROUND

Traditional industrial protective coatings based on urea/melamine formaldehyde resin crosslinked systems have good performance and cost efficiency. However, coatings that release formaldehyde during cure are currently disfavored by customers. Alternative coating chemistries, such as isocyanates or azridine crosslinked systems, may have health or safety issues and typically have higher raw material costs than urea/formaldehyde resin systems. Other alternative coating chemistries, such as epoxies or silane compounds, are also expensive and typically must be cured at a relatively high temperature. Yet other alternative coating chemistries, such as organic peroxide cured unsaturated polyester coating systems that include styrene, are also currently disfavored by customers for health and safety reasons. Without styrene, the peroxide cured polyester coating systems generally require higher curing temperatures and/or extended curing times that are not suitable for many commercial applications.

SUMMARY

In general, the present disclosure is directed to coating compositions with cure conditions and raw material costs similar to or better than those for conventional urea/melamine formaldehyde resin crosslinked coating systems. These coating compositions cure without strong color development, which makes them well suited to formulate stains, primers, sealers and topcoats to finish a wide variety of substrates (e.g. wood, plastic and metal). In preferred embodiments, the coating compositions are at least substantially free of any of formaldehyde, isocyanate and styrene.

In one aspect, the present disclosure is directed to a coating composition including an unsaturated resin selected from polyesters, alkyds or combinations thereof; an alkoxy (meth) acrylic functional monomer; a thermoplastic compound containing active hydrogen groups; a curing agent; and a curing promoter such as at least one metal drier.

In yet another aspect, the present disclosure is directed to a method of making a coating composition, including reacting the following components to form a coating composition: (1) a first component A, including about 20 wt % to about 90 wt %, based on the total weight of the composition, of an unsaturated polyester resin, about 1 wt % to about 50 wt % of: an alkoxy(meth)acrylic functional monomer, and a thermoplastic compound containing active hydrogen groups; and about 0.1 wt % to about 3 wt % of least one metal drier; and (2) a second component B, including about 0.5 wt % to about 5 wt % of at least one organic peroxide.

In yet another aspect, the present disclosure is directed to a method including (1) providing a coating composition including an unsaturated polyester resin, an alkoxy(meth) acrylic functional monomer, and a thermoplastic compound containing active hydrogen groups reactive under free radical initiated curing; at least one metal drier, and a peroxide; and (2) applying the coating composition to a substrate.

In yet another aspect, the present disclosure is directed to a substrate having applied thereon a cured coating composition. The coating composition includes an unsaturated polyester resin; an alkoxy(meth)acrylic functional monomer, and a thermoplastic compound containing active hydrogen groups reactive under free radical initiated curing; at least one metal drier; and a peroxide.

The details of one or more embodiments of the invention are set forth in the description below. Other features, objects, and advantages of the invention will be apparent from the description, and from the claims.

DETAILED DESCRIPTION

In one embodiment, the coating composition includes at least one of an unsaturated polyester resin, an alkyd resin or combinations thereof; at least one an alkoxy(meth)acrylic functional monomer and a thermoplastic compound containing active hydrogen groups; a curing agent, and a curing promoter such as a metal drier.

A wide variety of unsaturated polyester and alkyd resins may be used in the coating composition. Any functionalized polyester or alkyd resin with ethylenic units may be used. Unsaturated polyesters and alkyds with hydroxyl, carboxyl, or allyl ether functionality are suitable, and unsaturated polyester resins and alkyds with allyl ether functionality are preferred. Preferred unsaturated polyesters and alkyds have a weight average molecular weight of about 500 to about 10,000, preferably about 1000 to about 6000, and more preferably about 2000 to about 5000.

Unsaturated polyester resins are preferred, and suitable examples include, but are not limited to, those available under the trade designation Roskydal from Bayer AG, Pittsburgh, Pa., and Roskydal 502BA is particularly preferred.

The unsaturated resin is typically present at about 10 wt % to about 80 wt %, preferably at about 20 wt % to about 60 wt %, and more preferably at about 30 wt % to about 50 wt %, based on the total weight of the coating composition.

The coating composition further includes at least one alkoxy(meth)acrylic functional monomer and a thermoplastic compound.

Suitable alkoxy(meth)acrylic functional monomers include: (1) at least one pendant (meth)acrylic functional group positioned at a terminal end and/or along a backbone; and (2) at least one alkoxy (OR, wherein R is any alkyl radical) linking group along the backbone. In this application, (meth)acrylic and the designation Ac refer to an acrylate group, a methacrylate group, or mixtures and combinations thereof.

Preferred alkoxy(meth)acrylic functional monomers have a molecular weight of about 200 to about 2000, and include multiple (meth)acrylic functional groups and at least one alkoxy group along the backbone. More preferred alkoxy (meth)acrylic functional monomers include di and tri(meth) acrylic functional compounds with at least one alkoxy group along the backbone. The alkoxy group is preferably an ethylene oxide or a propylene oxide group. Most preferably, the backbone includes about 8 to about 16, preferably about 8 to about 12, and more preferably about 8, ethoxy or propoxy repeat units, and ethoxy repeat units are particularly preferred.

For example, a particularly preferred monomer may have the formula $[Ac-O-R_1-(OR_2)_n-R_1-O-Ac]$, where $R_1$ and $R_2$, or both, can be $(CH_2)_x$, with x=2, and n=8 to 12.

Suitable alkoxy(meth)acrylic functional monomers include, but are not limited to, polyethylene glycol or polypropylene glycol di(meth)acrylates available from Sartomer Corp., Exton, Pa., under the trade designations Sartomer SR 209, 210, 252, 259, 268, 344, 603, 610, 644, 740, and/or combinations thereof.

The alkoxy(meth)acrylic functional monomers are typically present at about 0.5 wt % to about 50 wt %, preferably at about 1 wt % to about 30 wt %, and more preferably at about 3 wt % to about 10 wt %, based on the total weight of the coating composition.

Substitution is anticipated on the organic groups used in the coating compositions of the present invention. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc.

In addition to the alkoxy(meth)acrylic functional monomers, the coating composition further includes a thermoplastic polymer with active hydrogen groups that are reactive under free radical initiated curing. Suitable thermoplastic polymers include thermoplastic co-promoter compounds that, according to presently available evidence, accelerate the curing reactions and improve at least one property of the uncured or cured coating such as, for example, sagging resistance and flexibility. The thermoplastic compound may include any synthetic resin with active hydrogen groups. Suitable examples include cellulose based resins and acetoxy or acetate functionalized acrylics which are obtained through free radical polymerization of ethylenic monomers. Preferred examples include, but are not limited to, cellulose or cellulose derivatized resins such as cellulose acetate butyrate (CAB), cellulose acetate (CA) and combinations thereof.

The thermoplastic compounds are typically present in the coating composition at about up to about 20 wt %, preferably about 0.2 wt % to about 20 wt %, more preferably about 0.5 wt % to about 10 wt %, and most preferably from about 0.5 wt % to about 6 wt %, based on the total weight of the coating composition.

The coating composition also preferably includes at least one curing agent. A wide range of curing agents may be used, and peroxide compounds, particularly organic peroxides, are particularly preferred. Examples of organic peroxides include ketone peroxides, peresters, perketals, and benzoyl peroxides such as those available under the trade designation Luperox from Arkema, Philadelphia, Pa. Ketone peroxides are preferred, and suitable ketone peroxides are available under the trade name Luperox from Arkema, Inc., as well as from Norac, Inc., Azusa, Calif., under the trade designation Norox. Norox MEKP-9, which is a solution of methyl ethyl ketone (MEK) peroxide in dimethyl phthalate, is particularly preferred.

The curing agent is typically present in the coating composition at about 0.2 wt % to about 5 wt %, preferably about 0.5 wt % to about 3 wt %, and more preferably about 0.5 wt % to about 2.0 wt %, based on the total weight of the coating composition.

The coating composition further includes at least one metal drier to enhance curing speed. Suitable metal driers include metal salts of organic acids effective in catalyzing free-radical polymerization of the unsaturated polyester used in the coating composition. Metal driers are typically metal salts of cycloalkanic acids such as naphthenic acid, alkanic acids such as neodecanoic acids, and C8 to C20 fatty acids. Suitable metals include Co, Mn, Pb, Ce, Zr, Ca, Zn, Bi, Cu, Cr, Li, K, Ni, Ne and mixtures and combinations thereof. Preferred metal driers include naphtenates and C8 to C20 fatty acid salts of K, Co, Mg, Ca and mixtures and combinations thereof. Particularly preferred metal driers include Co salts, and include, for example, cobalt naphthalates, citrate, acetyl-acetonate, 2-ethylhexanoate, and the like. Metal driers in an organic hydrocarbon solvent are preferred for use in the coating composition. Suitable commercially available metal driers include, for example, those available from Tenneco, Inc., Piscataway, N.J. under the trade designation Syn Nuxtra Co 12, Syn Nuxtra Mg 12, and Syn Nuxtra K 15:

The metal driers may be present in the coating composition in any catalytically effective amount, and typically the driers are present at about 0.1 wt % to about 2 wt %, preferably about 0.2 wt % to about 2 wt %, and more preferably about 0.3 wt % to about 1.5 wt %, based on the total weight of the coating composition.

The coating composition is preferably solvent borne. Suitable organic solvents include, but are not limited to, butyl acetate, methyl ethyl ketone (MEK), xylene and mixtures and combinations thereof.

The organic solvent is preferably present in the coating composition at about 5 wt % to about 80 wt %, preferably about 5 wt % to about 70 wt %, and more preferably about 5 wt % to about 60 wt %, based on the total weight of the coating composition.

Additional (meth)acrylic functional monomers may optionally be incorporated into the coating composition to improve and/or modify the properties of the cured coating. Suitable (meth)acrylic functional monomers preferably include multiple (meth)acrylate functional groups, which may be positioned at the terminal ends and/or along the backbone of the monomer.

In one embodiment, the optional (meth)acrylic functional monomers include, but are not limited to, di(meth)acrylates having the formula Ac-$(Z)_n$-Ac, wherein Z is preferably alkoxy and n=1 to 5. In another embodiment, the (meth) acrylic functional compounds include, but are not limited to, tri(meth)acrylates with the formula Ac-$[Z(Ac)_2]_n$, wherein Z is preferably alkoxy and n=1 to 8. The alkoxy group Z in the di and tri(meth)acrylate compounds may include a linear or branched alkyl radical, which may be substituted or unsubstituted. Unsubstituted linear alkyl groups with less than about 5 carbon atoms are preferred.

Suitable examples include tripropylene glycol diacrylates such as those available from Sartomer Corp., Exton, Pa., under the trade designation Sartomer SR 306, as well as trimethylolpropopane triacrylates such as, for example, those available from Sartomer under the trade designation Sartomer SR 351, as well as combinations thereof.

The acrylic functional monomers are typically present in the coating composition at about 0 wt % to about 50 wt %, preferably about 2 wt % to about 20 wt %, and more preferably at about 2 wt % to about 10 wt %, based on the total weight of the coating composition.

The coating composition further optionally includes at least one surface active agent to enhance the flow/leveling and/or wetting properties of the coating composition. Suitable surface active agents include, but are not limited to, silicones and polyacrylates such as those available under the trade designation Byk from Byk-Chemie, Wesel, Germany. Suitable compounds include Byk 333, Byk 348, Byk 353, Byk 380 and mixtures and combinations thereof.

The surface active agent, if present, is included in the coating composition at about 0.1 wt % to about 3 wt %, preferably about 0.1 wt % to about 2 wt %, and more preferably about 0.1 wt % to about 1 wt %, based on the total weight of the coating composition.

The coating composition further optionally includes at least one rheology control agent to control sagging and pigment settling of the wetting properties of the coating composition. Suitable rheology control agents include, but are not limited to, polyureas such as those available under the trade designation Byk from Byk-Chemie, Wesel, Germany. Suitable compounds include Byk 410, 411 and mixtures and combinations thereof.

The rheology control agent, if present, is included in the coating composition at about 0.1 wt % to about 3 wt %, preferably about 0.1 wt % to about 2 wt %, and more preferably about 0.1 wt % to about 1 wt %, based on the total weight of the coating composition.

The coating composition may also optionally include solid particles such as pigments, fillers, matting agents, colorants, wax, and the like. Pigments are preferably used to give the coating composition the required hiding and opacity upon drying and curing. In addition to colorants, pigments may also be used to incorporate a desired color to the substrate, for example, white pigment may be used to form a coating composition having a white color. Alternatively, or in concert with having a desired color, flatting agents such as silicas may be used to give the substrate a desired matte finish. Suitable solid particles in this invention are present in the amount sufficient to give the desired opacity, finish texture, and/or general aesthetic quality to the coated substrate. Suitable pigments include aluminum oxides, titanium oxides, zinc oxides, and the like. An example of a pigment usable in the presently described coating composition includes Ti-Pure R-900, available from E. I. duPont de Nemours of Wilmington, Del.; Suitable flatting agents include, for example, amorphous silica (silica oxides) such as those available under the trade designation Syloid 169 from W. R. Grace Company of Baltimore, Md. Suitable fillers include, for example, clays, talc or other inorganic compounds. An example of a filler usable in the presently described coating composition includes Minex 10, available from Unimin Specialty Minerals Inc.

The amount of solid particles used in the coating composition may vary widely depending on the intended finish. For example, the amount of solid particles used is preferably less than about 40 wt % of the coating composition.

The unsaturated resin, the alkoxy acrylic functional monomers and the thermoplastic compounds, the curing agent, a catalytically effective amount of at least one metal drier, and any optional additives may be mixed in an organic solvent to form a coating composition. Preferably, a first component, referred to herein as component A, and a second component referred to herein as component B, are mixed to form the coating composition. For example, component A, which is preferably solvent-borne, may include an unsaturated resin, the alkoxy(meth)acrylic functional monomer and the thermoplastic compound, the metal drier and any optional additives. Component B includes the curing agent.

The coating composition can be formulated into a stain, a primer, a sealer, a topcoat and the like to finish wood, engineered wood, plastic and metal substrates. Since the coating composition is rapidly curable at low temperatures, it is particularly well suited for application to wood substrates, and typical applications include home and/or office furniture, kitchen cabinets, flooring, window frames, doors, siding and the like.

The coating composition may be applied to a substrate by any conventional method, including, for example, spraying, brushing, dip coating, sheet coating, coil coating, roll coating, and the like. A spray system including a two component gun with equalizers has been found to provide particularly consistent results.

Following application, the coating composition is cured to form a protective and/or decorative coating on the substrate. The cure time varies depending on the cure conditions selected, such as temperature, dwell time, room temperature, and the like. If desired, the coated substrate may be heated, for example, in a conventional oven. While not wishing to be bound by any theory, presently available data indicate that alkoxy linking groups in the (meth)acrylic functional monomer or thermoplastic resin that has active hydrogen groups reactive to free radicals enhance the curing reactions of the unsaturated polyester compound and promote the film formation, which reduces cure times at low temperatures and provides a coating with low color development.

The coating composition may then be cured at low temperatures, which in this application refers to temperatures less than 70° C., to form a coating on the substrate. At room temperature, the coating composition cures in less than about 24 hours. At more preferred curing temperatures of about 30° C. to about 60° C., the coating composition cures in less than about 30 minutes, more preferably less than about 20 minutes. At a curing temperature of about 30° C. to about 60° C., the coating composition cures to form a coating in about 5 minutes to about 30 minutes, more preferably in about 5 minutes to about 20 minutes, and even more preferably in about 6 minutes to about 15 minutes.

In certain embodiments, the coating composition and coating are substantially free of formaldehyde, isocyanates and styrene. In preferred embodiments the coating composition and coating are essentially free of formaldehyde, isocyanates and styrene, more preferably essentially completely free of formaldehyde, isocyanates and styrene, and most preferably completely free of formaldehyde, isocyanates and styrene.

The term substantially free means that the coating compositions and coating are contaminated with, or liberate as a result of curing, no more than about 0.5 percent by weight of any of formaldehyde, isocyanate and styrene. The term essentially free means that the coating compositions and coating are contaminated with, or liberate as a result of curing, no more than about 0.5 percent by weight of any of formaldehyde, isocyanate and styrene. The term essentially completely free means that the coating compositions and coating are contaminated with, or liberate as a result of curing, no more than about 0.1 percent by weight of any of formaldehyde, isocyanate and styrene. The term completely free means that the coating compositions and coatings are contaminated with, or liberate as a result of curing, less than 5 parts per million (ppm) of any of formaldehyde, isocyanate and styrene.

In a preferred embodiment, following cure the coating on the substrate is not substantially tinted, and in a preferred embodiment forms a substantially colorless film. In some embodiments the cured coating forms a water white, no color film. The color of a sample may be evaluated by any known technique based on the CIE L*a*b* color scheme. For example, to evaluate the color of a sample a spectrophotometer such as those available from Datacolor, Inc under the trade designation Spectraflash, Model No. SF650X, may be used.

The cured coating is also highly flexible, which ensures that it will not crack, chip or delaminate from a substrate, particularly on edges or complex contours. The flexibility of the coating was tested using Pentagon Mandrel Rods according to ASTMD 522-80 and the results were graded on a scale of 1 to 10, in which 10 indicates the most flexible coating, and 1 indicates the least flexible coating.

EXAMPLES

In a 2000 ml stainless steel beaker, 1000 grams of each of the coating formulations was prepared for testing. The first component A was formulated and the ingredients were accurately weighted and added into the beaker in the order gradually under agitation (10-15 RPM) according to Table 1. In Table 1, compositions 6-7 exemplify preferred coating compositions, while compositions C1-C2 denote comparative examples.

Each sample was filtered (10 micro filter bags) and stored in a lined metal can for testing after a complete homogeneous formulation was achieved. 97 grams of each component A was weighed into a lined metal can (250 ml) and 3 grams of component B was dropwise added under agitation. The mixed sample was drawn down on white Leneta Charts using a 3 mil bird applicator within 5 minutes and the coated charts were air flash dried at room temperature for 15 minutes before placing the charts in an oven at 50° C. as function of the curing time. The curing time was recorded after the coating surface became tack-free for fingers in a latex glove.

The color reading of the cured coating compositions on the white Lenenta Charts was measured using a Spectraflash SF650X from Datacolor (Lawrenceville, N.J.) against the standard white background. The flexibility of the cured coating compositions was determined at a room temperature using Pentagon Mandrel Rods according to ASTMD 522-80 and the results were graded on a scale of 1 to 10, in which 10 indicates the most flexible coating, and 1 indicates the least flexible coating. The properties of the resulting coating compositions are shown in Table 2.

TABLE 2

Properties of the Coating Compositions

| Formulas | Curing Time (min) | Color, dE | Flexibility* |
|---|---|---|---|
| Formula C1 | 28 | 4.12 | 5 |
| Formula C2 | 20 | 7.18 | 3 |
| Formula 1 | 23 | 3.88 | 7 |
| Formula 2 | 24 | 3.88 | 7 |
| Formula 3 | 28 | 3.91 | 5 |
| Formula 4 | 25 | 4.22 | 6 |
| Formula 5 | 27 | 4.31 | 5 |
| Formula 6 | 19 | 4.08 | 7 |
| Formula 7 | 17 | 4.16 | 8 |

In comparison with control C1, compositions 6 and 7 with additions of polyethylene glycol diacrylate showed significantly faster curing speed and less curing time, less color change and improved flexibility.

Addition of more metal driers speeded the curing of the coating formulation and decreased the curing time (Composition C2). However, the use of more metal driers resulted in strong color development, which is less desired for aesthetic reasons, especially on light or white substrates.

The addition of cellulose acetate butyrate (CAB) in examples 4, 6 and 7 increased the curing reaction in comparison with addition of non-active hydrogen containing polyacrylics Paralloid B66 (Example 5) and control composition C1. Compositions with addition of both polyethylene glycol acrylate and cellulose acetate butyrate (Compositions 6 and 7) showed the fastest curing speed, good flexibility and low color development relative to composition C2.

Various embodiments of the invention have been described. These and other embodiments are within the scope of the following claims.

TABLE 1

Coating Compositions

| Components | | C1 | C2 | 1 | 2 | 3 | 4 | 5 | 6 | 7 |
|---|---|---|---|---|---|---|---|---|---|---|
| Component A | Roskydal 502 BA | 400 | 400 | 400 | 400 | 400 | 400 | 400 | 400 | 400 |
| | Trimethylolpropane Triacrylate | 90 | 90 | 90 | 90 | 90 | 90 | 90 | 90 | 70 |
| | Tripropylene glycol diacrylate | 60 | 60 | 0 | 0 | 0 | 60 | 60 | 0 | 0 |
| | Polyethylene glycol diacrylates (400) | 0 | 0 | 60 | 0 | 0 | 0 | 0 | 60 | 70 |
| | Polyethylene glycol dimethacrylates (400) | 0 | 0 | 0 | 60 | 0 | 0 | 0 | 0 | 0 |
| | Polypropylene glycol dimethacrylate (400) | 0 | 0 | 0 | 0 | 60 | 0 | 0 | 0 | 0 |
| | Cellulose acetate butyrate | 0 | 0 | 0 | 0 | 0 | 30 | 0 | 30 | 40 |
| | Polyacrylics, Paralloid B-66 | 0 | 0 | 0 | 0 | 0 | 0 | 30 | 0 | 0 |
| | Syn Nuxtra Cobalt 12 | 6.0 | 9.0 | 6.0 | 6.0 | 6.0 | 6.0 | 6.0 | 6.0 | 6.0 |
| | Syn Nuxtra Mg 12 | 2.0 | 4.0 | 2.0 | 2.0 | 2.0 | 2.0 | 2.0 | 2.0 | 2.0 |
| | Syn Nuxtra K 15 | 2.0 | 5.0 | 2.0 | 2.0 | 2.0 | 2.0 | 2.0 | 2.0 | 2.0 |
| | Byk 380 | 4.0 | 4.0 | 4.0 | 4.0 | 4.0 | 4.0 | 4.0 | 4.0 | 4.0 |
| | Byk 348 | 4.0 | 4.0 | 4.0 | 4.0 | 4.0 | 4.0 | 4.0 | 4.0 | 4.0 |
| | Byk 353 | 2.0 | 2.0 | 2.0 | 2.0 | 2.0 | 2.0 | 2.0 | 2.0 | 2.0 |
| | Butyl acetate | 230 | 222 | 230 | 230 | 230 | 230 | 230 | 230 | 230 |
| | MEK | 160 | 160 | 160 | 160 | 160 | 160 | 160 | 160 | 160 |
| | Xylene | 10 | 10 | 10 | 10 | 10 | 10 | 10 | 10 | 10 |
| Component B | Norox ® MEKP-9 | 30 | 30 | 30 | 30 | 30 | 30 | 30 | 30 | 30 |
| Total | | 1000 | 1000 | 1000 | 1000 | 1000 | 1000 | 1000 | 1000 | 1000 |

The invention claimed is:

1. A coating composition, comprising:
   an unsaturated polyester resin, wherein the unsaturated polyester comprises allyl ether functionality;
   an alkoxy (meth)acrylic functional monomer, wherein the functional monomer is selected from di and tri(meth)acrylic functional compounds with about 8 to about 16 ethoxy or propoxy groups along a backbone;
   a thermoplastic compound containing active hydrogen groups, wherein the thermoplastic compound is selected from cellulose acetate butyrate (CAB), cellulose acetate (CA) and combinations thereof;
   at least one metal drier, wherein the metal drier is a metal salt of an organic acid, and wherein the metal comprises Co, Mn, Pb, Ce, Zr, Ca, Zn, Bi, Cu, Cr, Li, K, Ni, Ne and mixtures and combinations thereof; and
   a curing agent;
   wherein the composition is substantially free of any of formaldehyde, isocyanate and styrene.

2. The coating composition of claim 1, wherein the alkoxy (meth)acrylic functional monomer comprises ethoxy groups.

3. The coating composition of claim 1, wherein the alkoxy (meth)acrylic functional monomer comprises at least one of ethylene glycol and propylene glycol units.

4. The coating composition of claim 1, wherein the backbone of the alkoxy (meth)acrylic functional monomer comprises 8-12 ethoxy or propoxy groups.

5. The coating composition of claim 1, wherein the backbone of the alkoxy (meth)acrylic functional monomer comprises 8 ethoxy or propoxy groups.

6. The composition of claim 1, wherein the metal comprises K, Co, Mg and mixtures and combinations thereof.

7. The composition of claim 1, wherein the metal comprises Co.

8. The composition of claim 1, wherein the organic acid comprises a C8 to C20 fatty acid.

9. The composition of claim 1, further comprising a second (meth)acrylic functional monomer.

10. The composition of claim 1, further comprising at least one of a surface active agent, a filler, a pigment and a colorant.

11. The composition of claim 1, the curing agent comprises at least one peroxide compound.

12. The composition of claim 11, wherein the peroxide compound is a ketone peroxide.

* * * * *